United States Patent [19]

Förster et al.

[11] Patent Number: 4,909,192

[45] Date of Patent: Mar. 20, 1990

[54] METHOD AND CYLINDER HEAD STRUCTURE FOR SUPPLY OF FUEL INTO A PISTON ENGINE

[75] Inventors: Siegfried Förster, Aldsorf; Peter Quell, Aachen-Haaren, both of Fed. Rep. of Germany

[73] Assignee: Kernforschungsanlage Jülich Gesellschaft mit beschränkter Haftung, Julich, Fed. Rep. of Germany

[21] Appl. No.: 253,058

[22] Filed: Oct. 4, 1988

[30] Foreign Application Priority Data

Oct. 10, 1987 [DE] Fed. Rep. of Germany ....... 3734346

[51] Int. Cl.⁴ .............................................. F02D 19/00
[52] U.S. Cl. ........................... 123/25 C; 123/193 CH; 123/557
[58] Field of Search ............... 123/557, 545, 250, 255, 123/25 C, 25 D, 25 B

[56] References Cited

U.S. PATENT DOCUMENTS

| | | | |
|---|---|---|---|
| 3,074,228 | 1/1963 | Lee | 123/25 C |
| 3,933,132 | 1/1976 | Kishishita | 123/25 C |
| 4,417,447 | 11/1983 | Thomas | 123/25 C |
| 4,542,717 | 9/1985 | Choe | 123/25 B |

*Primary Examiner*—E. Rollins Cross
*Attorney, Agent, or Firm*—Frishauf, Holtz, Goodman & Woodward

[57] ABSTRACT

Liquid fuel and water pressurized by fuel and water pumps are forced into a vaporizer which is heated by hot exhaust gases of a piston engine. The resulting vapor mixture is blown into the combustion chamber of a cylinder head of the engine at a speed up to that of sound near the end of the engine's compression stroke where it mixed with precompressed air. The resulting explosive mixture is ignited by self-ignition or by spark plug and the water vapor content mixed with the fuel vapor lowers the combustion temperature, resulting in a significant reduction of nitrogen oxide content in the exhaust gases. The ratio of water vapor to fuel vapor is preferably 1:1 to 3:1 and the temperature at which the vapor mixture is introduced into the cylinder is above the dew point of the fuel in the fuel vapor and water vapor mixture. The mixture of fuel with air is approximately stoichiometric. Diesel oil is useable, and also such bio-mass fuels as vegetable oils.

12 Claims, 1 Drawing Sheet

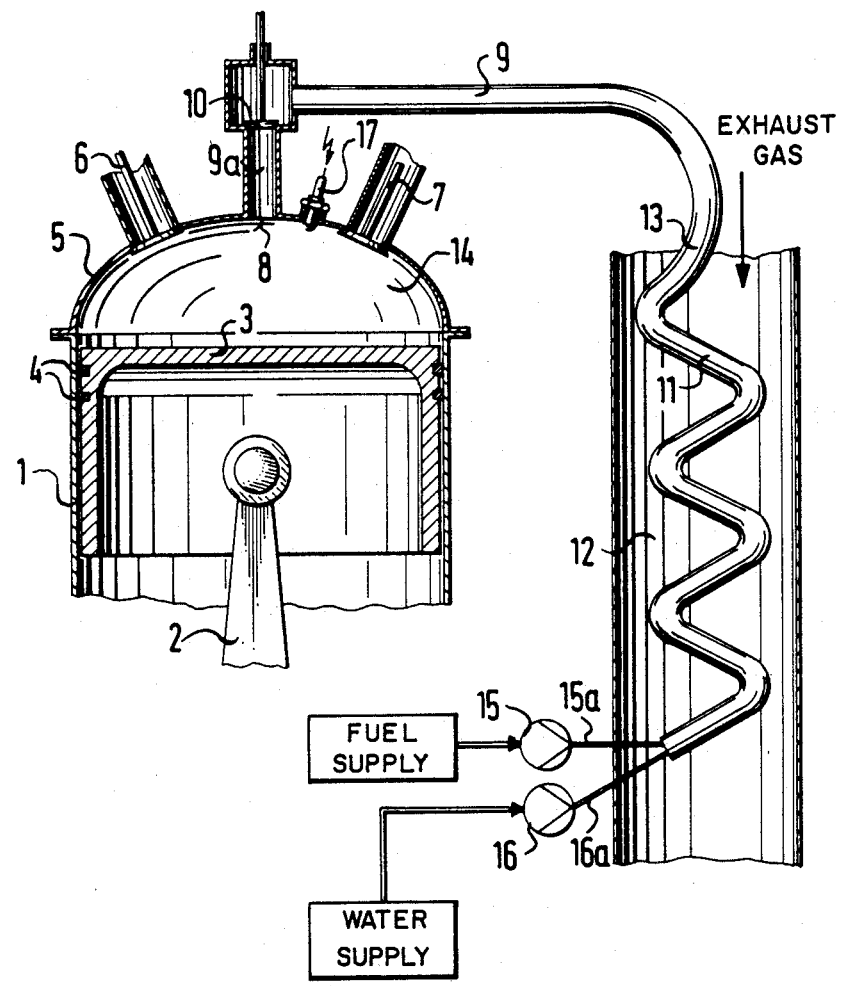

METHOD AND CYLINDER HEAD STRUCTURE FOR SUPPLY OF FUEL INTO A PISTON ENGINE

CROSS REFERENCE TO RELATED APPLICATION

Siegfried Förster, U.S. Ser. No. 084,337, filed Aug. 10, 1987.

The invention concerns a method supplying fuel into the cylinder chamber of a piston engine following the intake by suction of combustion supporting air. The invention also concerns a cylinder head structure including equipment for the utilization of the method of the invention.

SUMMARY OF THE INVENTION

It is an object of the present invention to improve the operation of internal combustion engines by simultaneous introduction of fuel vapor and water vapor into a piston engine in order that the fuel would already be available in the vapor state at its introduction to the cylinder chamber and so that after mixing with combustion air, a homogeneous ignitable mixture may be obtained.

Briefly, after the intake of combustion air into the cylinder and during the compression of the air therein before the upper dead point of the travel of a piston in the cylinder, a mixture of fuel vapor and water vapor is introduced into precompressed combustion air in the cylinder.

Preferably the fuel vapor and water vapor mixture is introduced into the combustion chamber of the cylinder at a high velocity that extends up to and approaches the velocity of sound in order to obtain constancy of injection conditions for the fuel vapor and water vapor that is injected. The essential advantages of the invention are that by the presence of the water vapor in the fuel vapor and water vapor mixture during the of the cylinder the combustion temperature in the cylinder chamber is lowered by the water vapor, which leads to a significant reduction of the nitrogen oxide content of the exhaust gas. Further, the energy involved in the supply and compression of the water vapor that is recoverable by expansion improves the engine efficiency.

In order to obtain combustion that is optimized as much as possible, the fuel vapor and water vapor mixture is so adjusted that the ratio of water vapor mass quantity to fuel vapor mass quantity is from 1:1 to 3:1. The temperature at which the fuel vapor and water vapor mixture is to be introduced into the cylinder combustion chamber should lie above the dew point temperature of the fuel in the fuel vapor and water vapor mixture. Furthermore, for optimization the combustion air should be sucked into the cylinder in approximately stoichiometric ratio to the fuel vapor quantity which is to be injected into the cylinder combustion chamber and, of course, compressed as above mentioned before the actual injection.

The method of the invention can be practiced effectively by means of a cylinder head structure equipped with an air intake valve, an exhaust gas valve and a controllable inlet valve for the fuel/water-vapor which discharges into the combustion chamber of the cylinder near the upper dead center of the piston. The cylinder head is distinguished by the fact that the fuel inlet valve is connected to a pressure line for the fuel vapor and water vapor mixture in which the fuel vapor and water vapor mixture is maintained under a pressure which is higher than the compression pressure of the combustion air compressed in the cylinder chamber.

The invention has the advantage that, in principle, already available cylinder heads can be utilized for the practice of the invention. The need for modification goes only so far as requiring replacement of the suction line for the fuel by a pressure line over which the fuel vapor and water vapor mixture can be blown into the cylinder chamber. The pressure line for the vapor mixture is connected directly to the output of a vaporizer for generating the fuel vapor and water vapor mixture. In a particularly advantageous development of the invention, the required pressure for the fuel vapor and water vapor mixture is already generated ahead of the vaporizer. Thus a water line supplying pressurized water and a pressurized fuel line have their outlets at the input of the vaporizer. These respective lines, at their pressure ends, are connected in the first case to a water pump and in the second case to a fuel pump.

For generating the fuel vapor and water vapor mixture from the pressurized water and fuel, motor exhaust gases are conveniently and effectively used by causing these gases to flow around the vaporizer for heating the fuel vapor and water vapor mixture.

The fuel vapor and water vapor and air mixture can be self-ignited in the case of Diesel-fuel or, on the other hand, it can be extraneously ignited in the case of benzine-fuel. In the last-mentioned case, an electric spark plug is located in the combustion chamber of the cylinder for igniting the fuel vapor and water vapor and air mixture.

BRIEF DESCRIPTION OF THE DRAWING

The invention is further described by way of illustrative example with reference to an illustrative embodiment of the cylinder structure of the invention.

The single FIGURE of the drawings is a schematic cross section of the cylinder structure with its associated vaporizer and pressurizing equipment.

DESCRIPTION OF THE ILLUSTRATED EMBODIMENT.

The drawing shows a cylinder head 1 within which is a piston 3 which moves with a piston rod 2 and is equipped with piston rings 4. The lower portion of the cylinder and the connection of the piston rod to a crankshaft, etc. are omitted to simplify the drawing. An air intake valve 6 for combustion air that is to be sucked into the cylinder head and an exhaust valve 7 for exit of exhaust gas are provided in the cover piece 5 of the cylinder head 1. An additional inlet 8 is provided in the cylinder head cover 5 to which a pressure line 9 is connected through a controllable inlet valve 10 and a short further pressure line portion 9a, for supplying a pressurized fuel vapor and water vapor to the cylinder mixture. That mixture is generated in a vaporizer 11 which is built as a serpentine tube in which liquid fuel and water are vaporized. A vaporizer of this kind is described in U.S. patent application Ser. No. 084,337, the disclosure of which is hereby incorporated by reference. The vaporizer 11 is installed in an exhaust duct 12 for gas coming from a piston driven motor of which the cylinder head 1 is a part. Hot exhaust gas coming out of the cylinder combustion chamber goes around and impinges on the vaporizer 11. The exhaust gas heat is thus advantageously used for generating the mixture of fuel vapor and water vapor.

The vapor mixture thus generated is led from the outlet 13 of the vaporizer 11 through the pressure line 9, 9a and the inlet valve 10 to the cylinder chamber 14. The cylinder chamber 14 is only schematically illustrated in the drawing. Inlet valve 10 is of course automatically opened by the motor and its timing and open interval is controlled in accordance with engine speed or, if desired, in accord with some more complicated injection control program.

In the illustrated case the fuel inlet valve 10 is so controlled that the fuel vapor and water vapor mixture is introduced through the cylinder chamber 14 at the end of the compression stroke close to the instant of the upper dead point. The fuel vapor and water vapor mixture is blown in at the speed of sound which amounts to about 400 meters per second in the case of a fuel vapor and water vapor mixture heated to about 280° C. The pressure in the mixture line 9 which is necessary for this operation is generated by liquid pumps 15 and 16. The fuel pump 15 forces the liquid fuel through a fuel line 15a into the vaporizer while the water pump 16 forces water through a water line 16a into the same vaporizer. The fuel vapor and water vapor mixture accordingly goes out of the vaporizer with the water vapor superheated.

After the introduction of the fuel vapor and water vapor mixture into the cylinder chamber 14 the fuel inlet valve 10 closes and the vapor mixture now mixed with combustion air is ignited by self-ignition or by a spark plug 17.

Diesel fuels are particularly well suited as fuel for the combustion engine operation method above described, but bio-mass fuels such as vegetable oils can also be used.

Although the invention has been described with reference to a particular illustrative example, it will be understood that variations and modification are possible within the inventive concept.

We claim:

1. Method of fuel supply into a cylinder head chamber of a piston-driven engine having a piston therein and in which, after combustion air is sucked into said chamber, said air is compressed before fuel injection comprising the steps of mixing and heating fuel vapor and water vapor to produce a vapor mixture;

injecting said vapor mixture into said cylinder head chamber under pressure exceeding the pressure of compressed air in said cylinder head chamber after said air has been compressed therein, at a time close to that of the upper dead point of piston travel in said cylinder head, and immediately thereafter causing the resulting air and mixed vapor mixture to explode in said chamber.

2. Method according to claim 1, in which the step of injecting said vapor mixture under pressure into said cylinder head chamber is performed at a high velocity approaching or equaling the speed of sound in said mixture at the temperature and pressure thereof.

3. Method according to claim 1, wherein the ratio of water vapor to fuel vapor in said vapor mixture is in the range from 1:1 to 3:1.

4. Method according to claim 2, wherein the ratio of water vapor to fuel vapor in said vapor mixture is in the range from 1:1 to 3:1.

5. Method according to claim 1, wherein the temperature to which said vapor mixture is heated and at which it is injected into said cylinder head chamber is higher than the dew point temperature of the fuel in said fuel vapor and water vapor mixture.

6. Method according to claim 2, wherein the temperature to which said vapor mixture is heated and at which it is injected into said cylinder head chamber is higher than the dew point temperature of the fuel in said fuel vapor and water vapor mixture.

7. Method according to claim 3, wherein the temperature to which said vapor mixture is heated and at which it is injected into said cylinder head chamber is higher than the dew point temperature of the fuel in said fuel vapor and water vapor mixture.

8. Method according to claim 1, wherein the air sucked into said chamber and compressed before fuel injection is present in said chamber, at the time said vapor mixture is injected, in at least approximately stoichiometric quantity ratio with respect to the fuel vapor content of said fuel vapor and water vapor mixture.

9. A cylinder head structure for a piston engine cylinder having a combustion chamber and a movable piston equipped with an air inlet valve and an exhaust gas outlet valve and a controllable inlet valve for fuel for introducing fuel to said combustion chamber at the upper dead point of said piston, further comprising a pressure line (9) connected to said fuel inlet valve for supplying a mixture of fuel vapor and water vapor under pressure exceeding the compression pressure in said cylinder chamber (14) and means for generating said mixture of fuel vapor and water vapor at said pressure exceeding said compression pressure and supplying said vapor mixture at said pressure to said pressure line.

10. Cylinder head structure according to claim 9, wherein said vapor mixture generating means includes a water pump (16) connected to a water supply, a fuel pump (15) connected to a liquid fuel supply, a vaporizer (11) having a water input connected by a pressurized water line (16a) to said water pump (16) and a fuel input connected by a pressurized fuel line (15a) to said fuel pump and means for heating the outputs of said water line and fuel line and vaporizing them under pressure.

11. Cylinder head structure according to claim 10, wherein said heating means for said vaporizer includes means for hot exhaust gas from said engine to flow around and in contact with a pressurized serpentine line in which said fuel and water are heated and vaporized in said vaporizer.

12. Cylinder head structure according to claim 9, wherein a spark plug is provided in the upper portion of said chamber for igniting the mixture of said fuel vapor and water vapor mixture with compressed air in said cylinder head chamber.

* * * * *